United States Patent [19]

Maitani et al.

[11] 4,101,911
[45] Jul. 18, 1978

[54] EXPOSURE INDICATOR FOR CAMERA HAVING ELECTRICAL SHUTTER

[75] Inventors: Yoshihisa Maitani, Hachioji; Atsushi Kidawara, Tachikawa, both of Japan

[73] Assignee: Olympus Optical Co., Ltd., Tokyo, Japan

[21] Appl. No.: 736,566

[22] Filed: Oct. 28, 1976

[30] Foreign Application Priority Data

Nov. 6, 1975 [JP] Japan .................... 50/150867[U]

[51] Int. Cl.² ............................................ G03D 17/20
[52] U.S. Cl. ........................................ 354/53; 354/57; 354/61
[58] Field of Search ................... 354/23 R, 47, 53, 54, 354/55, 56, 57, 59, 60 R, 60 E, 61, 289

[56] References Cited

U.S. PATENT DOCUMENTS

| 3,212,418 | 10/1965 | Küppenbender et al. | 354/53 |
| 3,555,984 | 1/1971 | Rentschler | 354/60 E |
| 3,611,893 | 10/1971 | Starp | 354/60 E |
| 3,623,409 | 11/1971 | Uno et al. | 354/56 |
| 3,688,657 | 9/1972 | Ueda | 354/60 E |
| 3,712,193 | 1/1973 | Kuramoto et al. | 354/47 |
| 3,921,188 | 11/1975 | Imura et al. | 354/60 R |
| 3,956,763 | 5/1976 | Yamanaka | 354/289 |
| 4,037,235 | 7/1977 | Veda | 354/53 |

Primary Examiner—Russell E. Adams
Attorney, Agent, or Firm—Ostrolenk, Faber, Gerb & Soffen

[57] ABSTRACT

An exposure indicator for a camera having an electrical shutter capable of taking pictures under both automatic exposure and manual exposure. The exposure indicator comprises a rotary shaft associated with a changeover switch which selectively activates a combination of a photometric circuit for automatic exposure and its associated first shutter drive and control circuit or another combination of photometric circuit for manual exposure and its associated second shutter drive and control circuit; a carrier slidable in response to a switching action of the rotary shaft; a display panel carried by the carrier and carrying a zero method index for manual exposure and also carrying a train of numerals indicative of exposure values for automatic exposure, said carrier operating to move the display panel into or out of the optical path of a viewfinder; and a meter pointer disposed in relation to the display panel and activated in accordance with the brightness of an object being photographed, thereby providing an indication of the exposure values of the electrical shutter within the field of the viewfinder during the time a picture is being taken under automatic exposure.

5 Claims, 3 Drawing Figures

EXPOSURE INDICATOR FOR CAMERA HAVING ELECTRICAL SHUTTER

BACKGROUND OF THE INVENTION

The invention relates to an exposure indicator for use with a camera having an electrical shutter, and more particularly to such an exposure indicator for use in a camera having an electrical shutter and capable of taking pictures under automatic and manual exposures and which is arranged to present a zero method index and a train of exposure values within the field of a viewfinder.

A camera having an electrical shutter is known which comprises a photometric circuit for automatic exposure and its associated first shutter drive and control circuit as well as another photometric circuit for manual exposure and its associated second shutter drive and control circuit. A camera of this type enables pictures to be taken under both automatic and manual exposures by selecting either combination of the photometric circuit and the shutter drive and control circuit by means of a change-over switch. A camera of the type described incorporates a so-called zero method exposure means for taking pictures under manual exposure wherein the pointer of an exposure meter which is interlocked with an exposure control mechanism of the camera is brought into alignment with the zero method index appearing within the field of the viewfinder, thereby manually determining a proper exposure.

When taking pictures under an automatic exposure, either the exposure period is automatically determined against a preset diaphragm aperture which is established by an aperture setting ring or the diaphragm aperture is automatically determined against a preset exposure period which is established by an exposure period setting ring. With a camera having an electrical shutter of the above design, the automatic determination of the exposure period or the diaphragm aperture presents a problem in the recognition of their specific value. To overcome this difficulty, it is also proposed to provide an exposure period display panel or a diaphragm aperture display panel which is associated with a meter pointer exposed through the field of view a viewfinder and capable of indicating a shutter period or a diaphragm aperture. Such a construction is already known in a camera having an electrical shutter which is only capable of taking pictures under an automatic exposure.

However, this arrangement cannot be adopted in a camera having an electrical shutter which permits taking pictures under both automatic and manual exposures since then there would exist a pair of meter pointers within the field of the viewfinder in either manual or automatic exposure mode, namely a meter pointer and its associated zero method index for taking pictures under a manual exposure, and a second meter pointer for indicating the value of the automatic exposure and associated diaplay panels for the exposure period and the diaphragm aperture in an automatic mode. The presence of these pointers prevents a correct reading of the proper indication. In addition, a pair of photometric circuits and a pair of meters are necessary, resulting in a complex arrangement.

SUMMARY OF THE INVENTION

It is an object of the invention to provide an exposure indicator for a camera having an electrical shutter which incorporates a single meter and a single photometric circuit while permitting an indication of the zero method index during a manual exposure mode and an indication of exposure factors during an automatic exposure to be presented within the field of a viewfinder by a switching action.

According to the invention, a photometric circuit including a meter and a light receiving element is switched between a manual exposure and an automatic exposure mode. A display panel carrier is adapted to be moved in response to the switching action so that the zero method index appears within the field of the viewfinder during a manual mode while the values of an automatic exposure are indicated within the field of the viewfinder in conjunction with the meter pointer during an automatic mode. In this manner, only one meter pointer appears within the field of the viewfinder, allowing an accurate and simplified reading thereof. The arrangement and the cost can thereby be reduced for practical implementation, by the provision of the single meter and the single photometric circuit.

DETAILED DESCRIPTION OF PREFERRED EMBODIMENT

Figure 1:
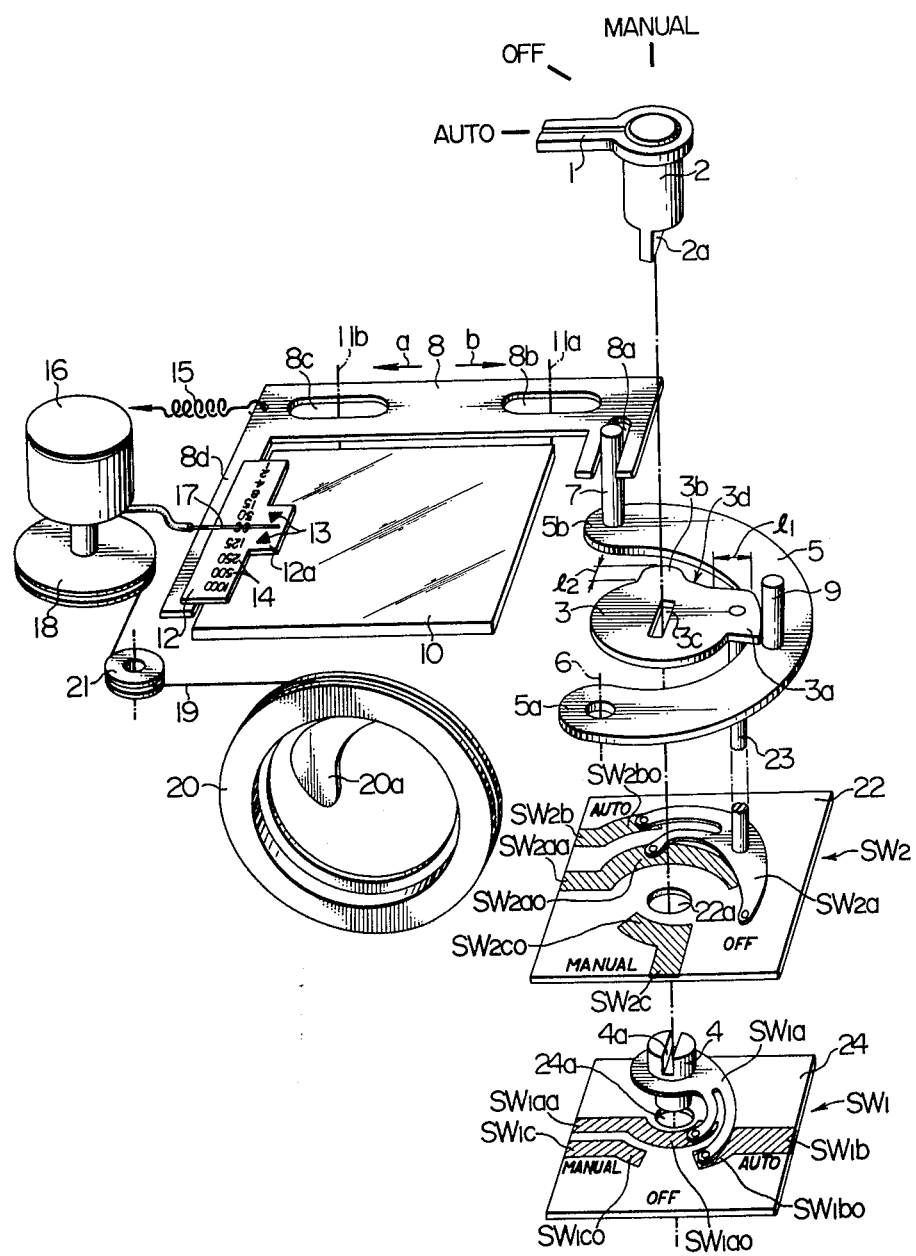
FIG. 1 is an exploded, perspective view of the exposure indicator constructed in accordance with one embodiment of the invention.

Referring to FIG. 1, there is shown a switching knob 1 which provides a selection between an automatic exposure and a manual exposure. The knob 1 is exposed externally of the camera and can be aligned with a selected one of AUTO, OFF and MANUAL indices labelled on the casing of the camera by an incremental rotation through 45°. It is to be noted that the camera of the present embodiment is designed such that a diaphragm aperture is preset during an automatic exposure mode, while during a manual exposure mode, an exposure period is determined by turning an exposure period setting ring and then a proper diaphragm aperture is established by turning a diaphragm aperture setting ring to bring a meter pointer into alignment with a zero method index.

The knob 1 includes a circular end which is fixedly connected with a rotary shaft 2, which extends into the interior of the camera and which is formed with an axial projection 2a having its both lateral sides removed. The projection 2a extends through a slit 3c formed centrally in a cam 3 and then tightly fits in a diametrically aligned notch 4a formed in the top face of a switch changing shaft 4, thus connecting the cam 3 and the shaft 4 together with the rotary shaft 2 for integral rotation.

The cam 3 comprises a disc cam, which is formed with a first cam edge 3a having a radial lenght of $l_1$ for an automatic exposure and a second cam edge 3b having a radial lenght of $l_2$ for a manual exposure along parts of its periphery. It is to be understood that cam edges 3a, 3b are phase displaced by 90° from each other along the periphery of the disc. The radial lenght $l_2$ of the cam edge 3b is nearly one-half the radial lenght $l_1$ of the cam edge 3a. As will be described later, the cam 3 serves to control a stroke through which a display panel carrier 8, which will be described later, shifts.

A U-shaped rocking arm 5 is disposed below the cam 3, generally in alignment with the outer periphery thereof. The rocking arm 5 operatively connects the cam 3 and the carrier 8 together, and has one end 5a which is pivotally mounted on a pin indicated at 6. A connecting pin 7 is fixedly mounted on the other end 5b of the rocking arm 5, and extends upwardly so as to be received in a fork 8a formed in one end of the carrier 8. Intermediate its ends, the rocking arm 5 fixedly carries a pin 9 which is adapted to bear selectively against the cam edges 3a, 3b and a recess 3d located between these cam edges.

The carrier 8 comprises a slidable plate disposed for sliding movement along one longer side of a focussing plate 10 of the camera, and is formed with a pair of longitudinally spaced, elongate guide slots 8b, 8c, which are engaged by stationary pins 11a, 11b so as to restrict the movement of the carrier in a direction parallel to the longer side of the focussing plate 10. The carrier 8 is L-shaped in configuration, and thus includes an extension 8d extending along the side of the focussing screen 10 which is located on the opposite side from the cam 3. The extension 8d forms a support for a display panel 12 to be described below.

The display panel 12 comprises a thin, rectangular sheet of a transparent material which is secured on the upper surface of the support 8d, having its longer side extending in parallel relationship with the support 8d. Along its one longitudinal edge, the display panel 12 is secured to the support 8d. On the opposite longitudinal edge, which is located inwardly if the inner edge of support 8d, the display panel 12 is centrally formed with an extension 12a which extends over the focussing screen 10. A zero method index 13 is inscribed for use in a manual exposure mode. A plurality of numbers 14 such as 1, 2, 4 ... 1,000, indicating values of an exposure period, are given in succession on the display panel 12.

The carrier 8 is biased by a coiled spring 15 to normally move in the direction indicated by an arrow a, and the resulting movement of the carrier is transmitted through the pin 7 and the rocking arm 5 to the pin 9, which is therefore urged to bear against the cam edge of the cam 3. In this manner, a movement of the carrier 8 is controlled by the cam edges 3a, 3b and the recess 3d. When the pin 9 bears against the cam edge 3a, the carrier 8 is allowed to slide through an increased stroke in the direction indicated by an arrow b, thus moving to a first display position in which the index 13 and the numerals 14 are both exposed through the field of the viewfinder. When the pin 9 bears against the cam edge 3b, the carrier 8 undergoes a sliding movement through a decreased stroke in the direction of the arrow b, thus moving to a second display position in which only the index 13 is exposed through the viewfinder. Finally, when the pin 9 bears against the recess 3d, the carrier 8 moves to a position in which the index 13 and the numerals 14 both disappear out of the field of the viewfinder.

There is provided a photometric meter 16 having a pointer 17 which extends over the display panel 12. The meter 16 is electrically connected with a photometric circuit to be described later, and operates in accordance with the brightness of an object being photographed. The meter 16 has its housing supported by a rotatable disc 18, which is in turn connected with a diaphragm aperture setting ring 20 through a transmission cord 19. Specifically, the disc 18 is has its periphery formed with a groove in which the transmission cord 19 is received, one end of the cord being secured to the disc 18. The cord 19 then extends around a pulley 21 and is passed around the periphery of the ring 20 to be secured thereto. Thus when the ring 20, having diaphragm blades 20a (only one being shown), is turned about the optical axis of the taking lens, not shown, the disc 18 also rotates to cause the meter 16 to rotate about its axis, resulting in an angular movement of the meter pointer 17.

A change-over switch SW2, which is associated with a photometric circuit to be described later in connection with FIG. 2 for switching its operation between an automatic exposure mode and a manual exposure mode, is disposed below the cam 3. The switch SW2 comprises a printed circuit board 22, a plurality of stationary contacts SW2aO, SW2bO, SW2cO, and a movable contact SW2a which is adapted to slide over these stationary contacts. Specifically, the printed circuit board 22 is centrally formed with an opening 22a through which the shaft 4 extends from below. The stationary contacts SW2aO to SW2cO are printed on the upper surface of the circuit board around the opening 22a. The movable contact SW2a engages the stationary contact SW2cO during a manual exposure mode while it engages the stationary contact SW2bO during an automatic exposure mode. The movable contact SW2a is fixedly attached to the lower end of an electrically insulating rod 23 which is fixed on and depends from the cam edge 3a, and is adapted to rotate about the opening 22a to provide a switching action as the cam 3 rotates.

Another change-over swtich SW1 associated with a shutter drive and control circuit, to be described later, is disposed below the change-over switch SW2. The switch SW1 switches the shutter drive and control circuit, shown in FIG. 3, between an automatic exposure mode and a manual exposure mode. Specifically, the switch SW1 comprises a printed circuit board 24, a plurality of stationary contacts SW1aO, SW1bO, SW1cO printed on the upper surface thereof, and a movable contact SW1a which is adapted to slide over these stationary contacts. As before, the board 24 is centrally formed with an opening 24a through which the shaft 4 rotatably extends. The movable contact engages the stationary contact SW1bO during an automatic exposure mode and engages the stationary contact SW1cO during a manual exposure mode. The movable contact SW1a is integrally carried by the shaft 4, which comprises an electrically insulating material, for rotation about the opening 24a, and thus provides a switching action as the shaft 4 rotates.

Figure 2:
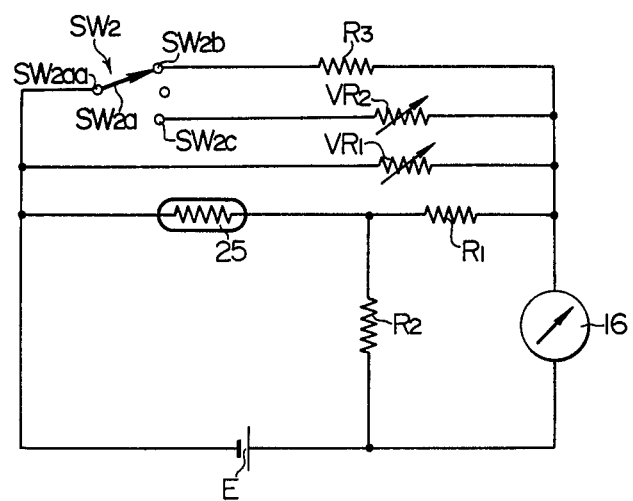
FIG. 2 is a circuit diagram of one exemplary form of the photometric circuit.

FIG. 2 shows a photometric circuit which is switched between an automatic and a manual exposure mode by means of the change-over switch SW2. The photometric circuit includes a d.c. source E across which is connected a series circuit comprising a photometric, light receiving element 25, a fixed resistor R1 and the meter 16, with the series combination of the resistor R1 and the meter 16 being shunted by a fixed resistor R2. The element 25 comprises a photoelectric transducer element such as Cds element and receives reflected light from an object being photographed to conduct a current through the meter 16 in accordance with the brightness thereof. The series combination of the element 25 and the resistor R1 is also shunted by a variable resistor VR1 which serves as a film speed presetting means.

The junction between the variable resistor VR1 and the element 25 is connected with a terminal SW2aa (see FIG. 1) of the stationary contact Sw2aO which is engaged by the movable contact of the change-over switch SW2. A terminal SW2b associated with the stationary contact for an automatic exposure is connected with the junction between the variable resistor VR1 and the resistor R1 through a resistor R3 which provides a correction for the shutter speed. A terminal SW2c associated with the stationary contact for a manual exposure mode is connected with the same junction through another variable resistor VR2. The variable resistor VR2 is mechanically interlocked with a shutter period setting ring, not shown, for introducing information concerning a desired exposure period into the photometric circuit during a manual exposure mode.

Figure 3:
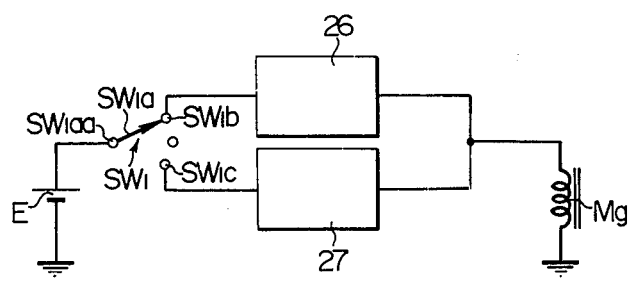
FIG. 3 is a circuit diagram of one exemplary form of a shutter drive and control circuit.

FIG. 3 shows a circuit arrangement for switching a shutter drive and control circuit between an automatic and a manual exposure mode by means of the change-over switch SW1. The electrical shutter includes an electromagnet Mg which can be activated to allow the shutter blades to be closed. The electromagnet Mg is driven by either output from a shutter drive and control circuit 26 associated with an automatic exposure or a shutter drive and control circuit 27 associated with a manual exposure. The circuit 26 comprises an electrical shutter circuit of a conventional form, and the circuit 27 is also formed by an electrical shutter circuit of a conventional form which permits a manual setting of an exposure period.

The change-over switch SW1 operates to connect the source E with the circuit 26 during an automatic exposure mode and to connect the source E with the circuit 27 during a manual exposure mode. Specifically, a terminal SW1aa is connected with a d.c. source E, and a terminal SW1b associated with the stationary contact for an automatic exposure is connected with the shutter drive and control circuit 26 while a terminal SW1c associated with the stationary contact for a manual exposure is connected with the shutter drive and control circuit 27.

In operation, assuming that the knob 1 is initially in OFF position, and it is desired to take pictures under an automatic exposure, the diaphragm aperture setting ring 20 is turned to establish a desired diaphragm aperture, since the camera disclosed is of a preset diaphram aperture type. Subsequently, the knob 1 is turned counter-clockwise through 45° to align it with the AUTO index. As a result of turning the knob 1, the rotary shaft 2 rotates counter-clockwise through 45° about its axis, accompanying a corresponding rotation of the cam 3. Thus the cam edge 3a engages and angularly moves the pin 9, whereby the rocking arm 5 is turned clockwise about the pin 6. This movement is transmitted through the pin 7 to cause a sliding movement of the carrier 8 through an increased stroke in the direction of the arrow b against the resilience of the spring 15, thus moving the carrier to its first display position. The display panel 12 integrally moves with the carrier, presenting both the zero method index 13 and the exposure numerals 14 within the field of the viewfinder.

The described counter-clockwise rotation of the rotary shaft 2 through 45° causes a corresponding counterclockwise rotation of the switch changing shaft 4 through 45°, whereby the movable contact SW1a is moved into engagement with the stationary contact SW1bO for an automatic exposure as shown in FIG. 1, thus connecting the source E with the shutter drive and control circuit 26 for an automatic exposure, as illustrated in FIG. 3. The rotation of the cam 3 also causes the movable contact SW2a of the change-over switch SW2 to engage the stationary contact SW2bO for an automatic exposure, as shown in FIG. 1, and become connected with the terminal SW2b, thus selecting an automatic exposure photometric circuit, as shown in FIG. 2. As a result, the light receiving element 25 receives reflected light from an object being photographed to conduct a current through the meter 16 in accordance with the brightness of the object being photographed. The pointer 17 swings in accordance with the value of current conducted through the meter 16. A resulting deflection of the pointer 17 can be read by a particular one of the numerals indicated on the display panel 12, thus knowing an exposure period which is provided by the electrical shutter.

When changing the camera from an automatic to a manual exposure mode, the knob 1 is turned clockwise through 90° into alignment with the index MANUAL. During a manual exposure mode, an exposure period is preset, so that the exposure period setting ring is turned to establish a desired exposure period. As the ring is turned, the effective resistance of the variable resistor VR2 is varied to introduce information representing an exposure period into the photometric circuit.

As the rotary shaft 2 rotates through 90°, the cam 3 also rotates clockwise through 90°, whereby the cam edge 3b bears against the pin 9. Because the cam edge 3b has a radial length which is one-half that of the cam edge 3a, it causes the rocking arm 5 to rotate counter-clockwise about the pin 6. As a consequence, the carrier 8 slides in the direction of the arrow a moving to a second display position. The display panel 12 thereon also moves to move the display numerals 14 out of the field of the viewfinder, presenting only the zero method index 13 within the field of view. A clockwise rotation of the cam 3 and the switch changing shaft 4 through 90° accompanies a clockwise rotation of the movable contacts SW2a and SW1a through 90°, thereby bringing them into engagement with the terminals SW2c, SW1c associated with the respective stationary contacts for a manual exposure.

When the change-over switch SW1 is thrown to the terminal SW1c, the source E is connected with the shutter drive and control circuit 27 for a manual exposure. When the photometric circuit is switched for a manual operation, the element 25 operates similarly as before to activate the meter 16, causing a deflection of the pointer 17 thereof in accordance with the brightness of an object being photographed. In a manual exposure mode, since the zero method is employed, the diaphragm aperture setting ring 20 is turned to cause a rotation of the meter 16 so as to bring the pointer 17 into alignment with the zero method index 13 within the field of the viewfinder. In this manner, the ring 20 may be used to determine a proper diaphragm aperture corresponding to a preset shutter period, thereby enabling a proper exposure through the action of the shutter drive and control circuit 27 upon shutter release.

When not in use, the knob 1 may be aligned with the OFF index. In this instance, the rotary shaft 2 rotates through 45° to cause the pin 9 to bear against the recess 3d in the cam 3. This results in a counter-clockwise rotation of the rocking arm 5 about the pin 6, whereby the resulting movement is transmitted through the pin 7 to move the carrier 8 in the direction of the arrow a, moving the display panel 12 out of the optical path of the viewfinder. Thus, both the display numerals 14 and the zero method index 13 disappear from the viewfinder, indicating that the camera is in its inoperative condition. In the inoperative condition of the camera, the movable contacts SW1a, SW2a are thrown to OFF positions intermediate the terminals SW1b, SW2b and the terminals SW1c, SW2c.

While the invention has been described above as applied to a camera in which a diaphragm aperture is preset during an automatic exposure mode, it will be understood that pictures can be taken with a preset exposure period during an automatic exposure mode, by bringing a desired exposure value displayed on the display panel 12 into alignment with the zero method index 13. With a camera in which a diaphragm aperture is preset during a manual exposure mode, the exposure period setting ring may be interlocked with the meter 16 to introduce information corresponding to a preset diaphragm aperture into the photometric circuit through the variable resistor VR2 shown in FIG. 2.

While in the embodiment described above, the rotary shaft 2 on which the knob 1 is mounted as well as the carrier 8 which carries the display panel 12 has been interconnected through the cam 3 and the rocking arm 5 so as to convert a rotary motion of the shaft 2 into a translational movement of the carrier 8, it should be understood that for a small angle of rotation through which the knob 1 rotates, the cam and the rocking arm may be omitted, and an interconnecting pin may be directly secured to the rotary shaft 2 for causing a translational movement of the carrier. However, the use of the cam and the rocking arm provides a flexibility in the design of the radial height and the location of the cam edges, thus permitting any desired stroke of the carrier 8 to be obtained without being limited by the angle of rotation through which the knob 1 is caused to rotate.

What is claimed is:

1. A mode indicator apparatus for use in a camera of the type which is operable in an automatic, a manual and an off mode and which includes an optical viewfinder, said apparatus comprising:

brightness indicator means including a meter pointer extending into the field of view of said viewfinder, said brightness indicator means for adjusting the position of said meter pointer within said field of view of said viewfinder as a function of the brightness of an object being photographed;

a display panel comprising first and second scales; said first scale including a plurality of spaced numbers disposed along said panel, each said number representing a different exposure period; said second scale including a zero method index;

said display panel being movable between: a first position wherein said first and second scales are within the field of view of said viewfinder, said first and second scales cooperating with said meter pointer to provide photometric information relevant to an automatic mode of operation; a second position wherein only said second index is within the field of view of said viewfinder, said second index cooperating with said meter pointer to provide photometric information relevant to a manual mode of operation; and a third position wherein neither said first nor said second scales are within the field of view of said viewfinder;

switch means movable between a first, a second and a third position for placing said camera in an automatic, a manual and an off mode, respectively; and display panel locator means for placing said display panel in said first, said second and said third position responsive to movement of said switch means into said first, said second and said third positions, respectively, whereby the relative position of said display panel within the field of view of said viewfinder provides a visual indication of whether said camera is in said automatic, said manual, or said off mode.

2. A mode indicator according to claim 1 wherein said viewfinder includes a focusing screen located in the optical path of said viewfinder and wherein said display panel is located adjacent said focusing screen.

3. A mode indicator according to claim 1 wherein said display panel comprises a thin sheet of a transparent material having said first and second scales formed therein.

4. A mode indicator according to claim 1 wherein:
    (A) said switch means includes a rotary shaft rotatable into a first, a second and a third position corresponding to said first, said second and third position of said switch means, respectively; and
    (B) said display panel locator means includes:
        (1) a carrier plate movable into a first, a second and a third position, said display panel being connected to said carrier plate such that said display panel is moved into its first, its second and its third position when said carrier plate is moved into its first, its second and its third position, respectively;
        (2) a cam mounted for rotation with said rotary shaft, said cam having first, second and third cam edges; and
        (3) cam follower means biased into engagement with said cam edges and responsive to movement of said rotary shaft into its first, its second and its third positions for moving said carrier into said first, said second and said third positions, respectively.

5. A mode indicator according to claim 4 wherein said cam follower means comprises a rocking arm having a first pin which is adapted to bear against said edges of said cam and a second pin which is coupled to said carrier plate, said rocking arm adapted to move said carrier plate into said first position when said first cam edge contacts said first pin, into said second position when said second cam edge contacts said first pin, and into said third position when said third cam edge contacts said first pin.

* * * * *